United States Patent
Engelsberg et al.

(10) Patent No.: US 6,675,075 B1
(45) Date of Patent: Jan. 6, 2004

(54) DEVICE FOR REPRESENTING INFORMATION IN A MOTOR VEHICLE

(75) Inventors: Andreas Engelsberg, Hildesheim (DE); Sven Bauer, Hildesheim (DE); Bernd Schmale, Hildesheim (DE); Holger Kussmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,296

(22) PCT Filed: Oct. 7, 2000

(86) PCT No.: PCT/DE00/03532
§ 371 (c)(1),
(2), (4) Date: Apr. 22, 2002

(87) PCT Pub. No.: WO01/29640
PCT Pub. Date: Apr. 26, 2001

(30) Foreign Application Priority Data

Oct. 22, 1999 (DE) .......................... 199 51 001

(51) Int. Cl.$^7$ .............................................. G06F 165/00
(52) U.S. Cl. ................. 701/1; 701/200; 701/23; 73/178 R; 359/630; 353/11; 353/12; 345/4; 345/7
(58) Field of Search ................. 701/1, 200, 209, 701/211, 23; 73/178 R; 359/630, 815; 345/4, 6, 7, 9; 353/11, 12, 15

(56) References Cited

U.S. PATENT DOCUMENTS

| | | | | |
|---|---|---|---|---|
| 4,973,149 A | | 11/1990 | Hutchinson | |
| 4,978,214 A | * | 12/1990 | Kawata | 353/114 |
| 5,422,812 A | * | 6/1995 | Knoll et al. | 701/209 |
| 6,140,957 A | * | 10/2000 | Wilson et al. | 342/357.08 |
| 6,480,148 B1 | * | 11/2002 | Wilson et al. | 342/357.08 |
| 6,532,113 B2 | * | 3/2003 | Aoki et al. | 359/630 |

FOREIGN PATENT DOCUMENTS

| | | |
|---|---|---|
| DE | 198 07 065 | 9/1999 |
| FR | 2706824 A1 * | 12/1994 |
| WO | WO98/05992 | 2/1998 |

OTHER PUBLICATIONS

2003/0078728 –Engelsberg et al; Apr. 24, 2003–Navigation method in an automobile.*

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A device for presenting data in a vehicle as a function of the direction of view of the driver. The device includes a computing device, arrangements for the optical and/or acoustical presentation, an arrangement for the recognition of the driver's direction of view and various data sources. The arrangement for the recognition of the driver's direction of view transmits to computing device the measured direction of view of the driver, so that computing device transmits this direction of view to arrangements for the optical and/or acoustical presentation, so that the presentation of data from the various data sources is made visible in the driver's field of view. This may lead to increased safety in street traffic, since distraction of the driver by the various data of the data sources is greatly reduced.

13 Claims, 1 Drawing Sheet

DEVICE FOR REPRESENTING INFORMATION IN A MOTOR VEHICLE

FIELD OF THE INVENTION

The present invention relates to a device for presenting data in a vehicle.

BACKGROUND INFORMATION

Various data from various information sources may be displayed to the driver in a motor vehicle wherein a different display may be used for each information source. The driver directs his eyes to these different displays so as to absorb the respective data.

German Published Patent Application No. 198 07 065 describes a method for controlling the functions of mobile systems, in which image information, gathered from the retina image of the eye, using optoelectronic spectacles, is evaluated by a computing unit and used for obtaining control signals.

SUMMARY OF THE INVENTION

The present invention relates to a device for presenting data in a vehicle wherein the presented data may be adjusted to the activity of the driver. The direction of the driver's view may determine where to make the data visible. For this reason, the driver need not be prompted to look at displays to become aware of data, but, rather, his direction of view may determine where the data are made visible. This may increase the safety of the driver and of the other traffic participants.

The present invention may be further developed and improved.

In one example embodiment according to the present invention, data may be made visible on the windshield, because the windshield may represent the principal field of view of the driver. This may make superfluous the integration of an additional screen for displaying data in the vehicle, thereby potentially saving space in the vehicle.

In one further example embodiment of the present invention, the data may be made visible by a projection directly upon the driver's retina. This may make possible a three-dimensional presentation and enable doing without a projection surface. This further example embodiment may make the presentation of the data independent of the construction of the vehicle.

The data may be shown on a display which allows the data to appear three-dimensional. Thereby, a natural presentation may become possible, for example, in a navigational device. Depending upon the situation, one may choose between a two-dimensional and a three-dimensional presentation.

A combination of various arrangements of presentation may be applied, each of which may be used depending on the direction of the driver's view.

According to an example embodiment of the present invention, the device may be connected to a navigational device, so that the location of the vehicle and the highway routing may be made visible to the driver, and other, alternative highway routings may be made visible as well. In the same manner, for the highway routing, essential items in the driver's field of vision may be highlighted in color.

The device may also have a camera which records the scene behind the vehicle, so that a rearview mirror function may be achieved. This may increase the safety technology aspect of the present invention.

According to a further example embodiment of the present invention, the device may have a memory which has operating instructions, user prompting and a help function, which may be used by the driver for simplifying the use of his vehicle and the devices contained in it.

Moreover, the data may be called up and received from external data sources, using a transmitter-receiver station. This may make it possible for the driver to tap any desired data sources from the outside, in order to call up a wide range of possible data.

According to an example embodiment of the present invention, the device may be connected to a receiving station which makes possible receiving both data and audio programs. That may make it possible to receive data sent via digital radio, in particular, multimedia data, and to display them for the driver.

The driver may operate devices and/or process functions which may be presented, by changing his direction of view or by verbal inputs. This may also improve the safety of the driver, since he may continue to use his hands to control the vehicle.

According to an example embodiment of the present invention, the device may be connected to vehicle sensors, so that critical values of the vehicle may be made visible to the driver when actual values fall below or exceed these values, so that the driver may take appropriate measures.

In one further example embodiment of the present invention, the driver's direction of view may be measured by using reflected infrared light. This may also make possible detecting the driver's direction of view at night.

In addition, the rearview mirror and the height of the head rest may be set by actuating technology as a function of the driver's direction of view and the height of his head. This may achieve an increased measure of driving safety and driving comfort.

Components of the device and components connected to the device may be connected via a bus so that the configuration of the device may be made simpler and less costly.

DETAILED DESCRIPTION

Due to the integration of more and more information sources and communication units in a motor vehicle, the driver may be confronted with a flood of information that is difficult to cope with, and which may distract the driver from his real driving activity. Various sources of multimedia data, connection to the internet, driver information sources such as navigation units or driver support may overload and distract the driver. It may therefore be desirable not to impair the safety of the driver by these information sources. Therefore, according to one example embodiment of the present invention, a direction of view may be used in order to make visible the relevant data in the driver's direction of view. The driver thus may direct his view primarily to the traffic, in order to drive his vehicle more safely. The relevant data may then be made visible in his field of view.

Figure 1:
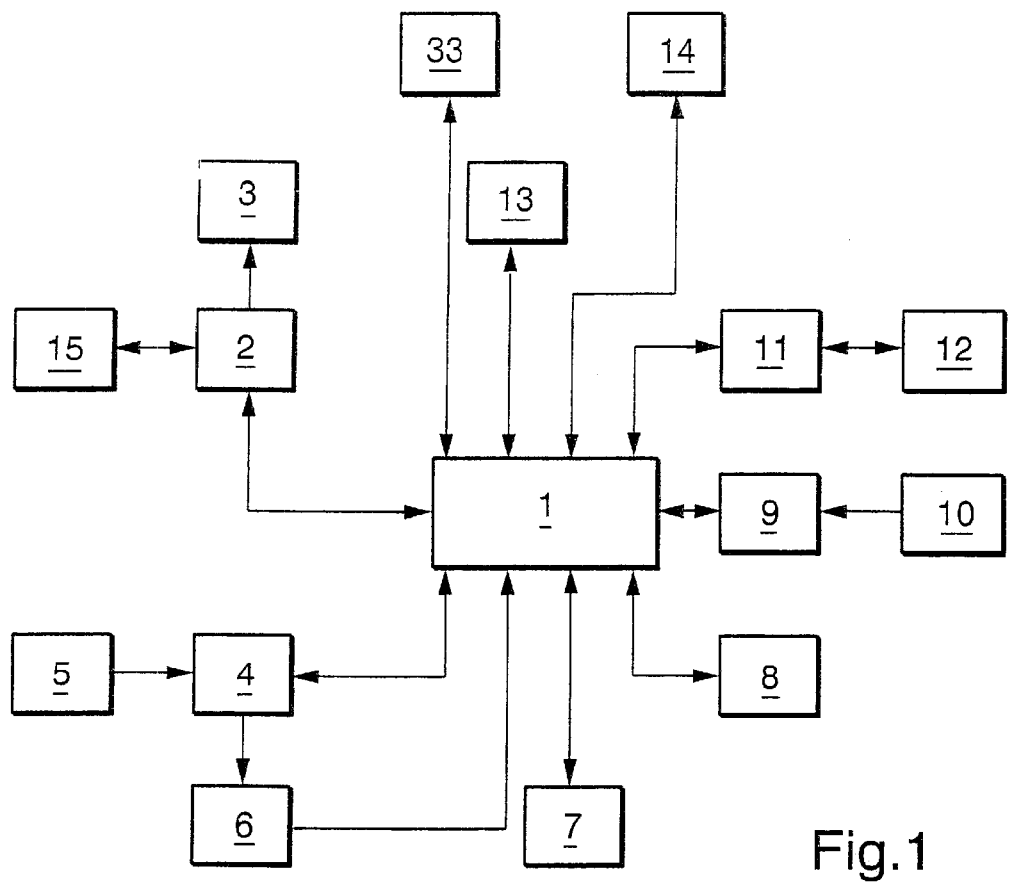
FIG. 1 shows a block diagram of an example embodiment of a device according to the present invention.

FIG. 1 shows a block diagram of an example embodiment of device, according to the present invention, which is built into a motor vehicle. A computing device 1 is connected to all connected units and manages the arriving data by transmitting these data to the appropriate connected units. Computing device 1 is connected to a signal processing unit 2, computing device 1 transmitting data via its first data input/output which are to be displayed, and receives data from signal processing unit 2 which contain execution commands of a driver. Signal processing unit 2 is connected to a combination 15, made up of a loudspeaker and a microphone and connected electronics, via a second data input/output. The microphone converts acoustical signals, e.g. the driver's commands, into electrical signals, which are amplified and digitized by the connected electronics, so that signal processing unit 2 receives a digital data stream from combination 15 which contains the driver's executive instructions. Signal processing unit 2 has data for performing voice recognition. An instruction set known to the driver is stored as a piece of data in a memory connected to signal processing unit 2, and is used for voice recognition. Using this, signal processing unit 2 derives simple, digitally coded commands from the driver's instructions. Signal processing unit 2 transmits these commands to computing device 1 so as to have the converted instructions recognized and evaluated, so as to execute a corresponding action.

Using the loudspeaker of combination 15, electrical signals are converted to acoustical signals. These electrical signals are transmitted by signal processing unit 2 to combination 15. They contain data for the driver stemming from various data sources, which are connected to computing device 1.

Furthermore, signal processing unit 2 is connected. via a data output to a display 3, which projects the data coming from signal processing unit 2 onto the windshield. This display 3 is called a head-up display in English, a projector being built into the dashboard, which makes visible optical data on the windshield that is coated with a suitable film. In this manner, data such as current speed, cooling water temperature and fuel gage may be directly made visible. Other data, such as those of a navigation device, tire pressure, shots of the scene behind the vehicle, operating instructions, a user prompting and a help assistant may be made visible here.

The driver is in a position to bring about certain actions by speaking or by his direction of view. Voice recognition was described above, and recognition of the direction of view is further described below. The direction of view permits the guidance of an arrow on display 3, so that the driver sees how and where he is guiding the arrow with his direction of view, and in particular, where his view is directed at the moment. In this connection, fields are made visible on the windshield which the driver activates by his direction of view. On these fields it says what their meaning is. One field is denoted as navigation. Whenever the driver directs his glance onto this field, it is opened. By further inputs, e.g. by speech or selection menus, he may use the possibilities of the navigational device by entering a destination, and appropriate routes, including alternative routes, to this destination may then made visible.

Another field may be represented by the automobile radio. The driver switches on the radio and selects stations by activating this field. Furthermore, he is able to have a storage medium such as a music cassette, a minidisk or a compact disk played. A further field is for a mobile phone, that is, a transmit/receive station. By activating this field, the driver may make a call or retrieve data using the mobile phone, e.g. web pages.

By activating another field, it may be possible for the driver to retrieve an operating instruction and/or a user prompting and/or a help function. These data are contained in a memory 12, and may be retrieved at the driver's command. In this connection, an acoustical as well as an optical presentation of these data may be possible. The help function offers a textual glossary that is made visible, and/or a dialog function, replies to the driver's questions being given textually or acoustically.

The driver's instructions, acoustical or by direction of view, are transmitted to computing device 1, which then activates the appropriate connected devices. The acoustical instructions proceed from signal processing unit 2 to computing device 1. Computing device 1 is informed about on which part of the windshield the display occurs, so that the direction of view of the driver may be related to it. On the one hand, the driver is shown, with the use of an arrow, to which display object he is directing his glance at the moment, and on the other hand, which instruction the driver is issuing by the direction of view.

As an alternative to the fields, the devices and the functions the driver activates may be made visible as words or images or characteristic signs.

Instead of a head-up display, other projection techniques may be possible. Such a technique is the projection of the data to be shown directly onto the retina, by a retina projector. In this situation, an electronically modulated light beam is projected through the pupil onto the retina, this light beam stimulating the light receptors of the retina, so that an image may be generated on the retina. In this connection, an image source delivers the data to be illustrated to a light source which is modulated correspondingly to the image data. This light source includes three different colors, red, green and blue, so that the data may be presented in the correct colors by using an appropriate mixture of light of these three light sources. In doing so, a low output of light may be used so that the retina may not be damaged.

The modulated light may then be screened by a scanner via the retina. This may need to be done correspondingly fast, so that the entire retina is activated, as happens with normal vision, too. An optical system may be connected to the scanner which projects the modulated lightbeam on the eye. This retina projector, then, may be fastened to the dashboard, so that the driver may have the data projected into his eyes corresponding to his direction of view.

A further possibility of optical presentation may include autostereoscopic screens. Autostereoscopic screens use two takes of an object in order to illustrate it. In this connection, the takes may be presented in such a manner that the eyes of the viewer see these takes separately. This may be achieved by giving the viewer appropriate glasses having different filters, so that the two eyes see different things.

Another technique, for which the viewer needs no glasses, provides the display with a lenticular screen, which may be connected to a detector for recognizing the position of the head, so that the lenticular screen is changed in such a manner that, depending on the position of the viewer's head, the viewer's eyes each see the corresponding image separately in order to obtain a spatial impression of the scene. This possibility of optical presentation may be seen in combination either with a head-up display or with a retina projector, so that other passengers in the vehicle or other data may be shown on this autostereoscopic screen.

Depending on the application, a two-dimensional and/or a three-dimensional form of color presentation may be applied, different displays also being usable. In the following, the specification may be limited to the use of a head-up display.

Computing device 1 is connected via a second data input/output to a signal processing unit 4, which, on its part, is connected to a camera 5 via a data input, this camera 5 having both a detector and infrared diodes by which the driver's eyes are illuminated, in order to detect the reflected infrared light output, and in order then to transmit this measuring result to signal processing unit 4.

Signal processing unit 4 transmits these data to a direction of view determination unit 6, which has a processor and a memory in order to calculate a direction of view of the driver from the data received from signal processing unit 4. This direction of view is then transmitted to computing device 1, which notifies connected signal processing unit 2 of this, so that display 3 is set as a head-up display corresponding to the direction of view of the driver, so that the data are only illustrated in the driver's direction of view. This means that a part of the windshield, which happens to be in the driver's direction of view, is used for the projection.

Furthermore, direction of view determination unit 6 may have the function that, when the driver's glance is averted from the street too long, a warning sound or a corresponding warning message is caused in acoustical and/or optical form. The time, which causes a warning on account of the averted glance, may be adaptively adjusted as a function of the speed of the vehicle.

Alternatively to determining the direction of view using an infrared light, which, in particular, may also work in darkness, the direction of view may also be ascertained by recording the driver's pupil and the reflection of his cornea and by image analysis.

Computing device 1 is connected to a transmitter/receiver station 7 via a third data input/output. Transmitter/receiver station 7 here is a mobile phone which may be used both for voice and data signals, so that the driver may retrieve data, using transmitter/receiver station 7, via acoustical and/or optical instructions, as described above. Computing device 1 is connected to an automobile radio via a fourth data input/output. By using an automobile radio, which is particularly suitable for digital radio broadcasting such as DAB (digital audio broadcasting), multimedia data may also be received, which may be selected by acoustical or optical instructions of the driver. These may then be presented acoustically by the loudspeaker of combination 15 and/or optically by display 3.

Computing device 1 is also connected as a processor, via a fifth data input/output, to a video analysis 9, to which a rearview mirror camera 10 is connected. Rearview mirror camera 10 is mounted near the rear end of the vehicle, so that the scene behind the automobile may be recorded, so as to make a rearview mirror function possible. Video analysis 9 processes these data and transmits them to computing device 1 which conducts them on to signal processing unit 2, so that these data may be presented using display 3.

Computing device 1 is further connected via a sixth data input/output to a processor 11, to which a memory 12 is connected via a data input/output. Memory 12 may contain data for user prompting, operating instructions and the help function. Furthermore, data may be stored here temporarily which may be received by transmitter/receiver station 7 or automobile radio 8. As needed, these data may be retrieved and, as described above, may be shown on display 3.

Computing device 1 is connected to a navigational device 14 via a seventh data input/output, so that the conventional functions of a navigational device may be shown on display 3 via computing device 1 and signal processing unit 2, when the driver wishes it.

Computing device 1 is connected to vehicle sensors 14 via an eighth data input/output. The sensors may deliver data concerning tire pressure, cooling water temperature or tank fuel level. When a critical value is undershot or exceeded, these data may be made visible on display 3. The threshold values are held in memory 12, actual measurements by the vehicle sensors 14 being passed on to processor 11, so that a threshold value comparison may be performed in processor 11.

Computing device 1 is connected to an actuating technology 33 via a ninth data input/output. Actuating technology 33 controls the rearview mirror and the headrest of the driver. As a function of the direction of view and the height of the driver's head, which may also be recognized by direction of view determination unit 6, computing device 1 transmits respective data to the actuating technology, so that the rearview mirrors and the height of the headrest may be adjusted to the driver.

Figure 2:
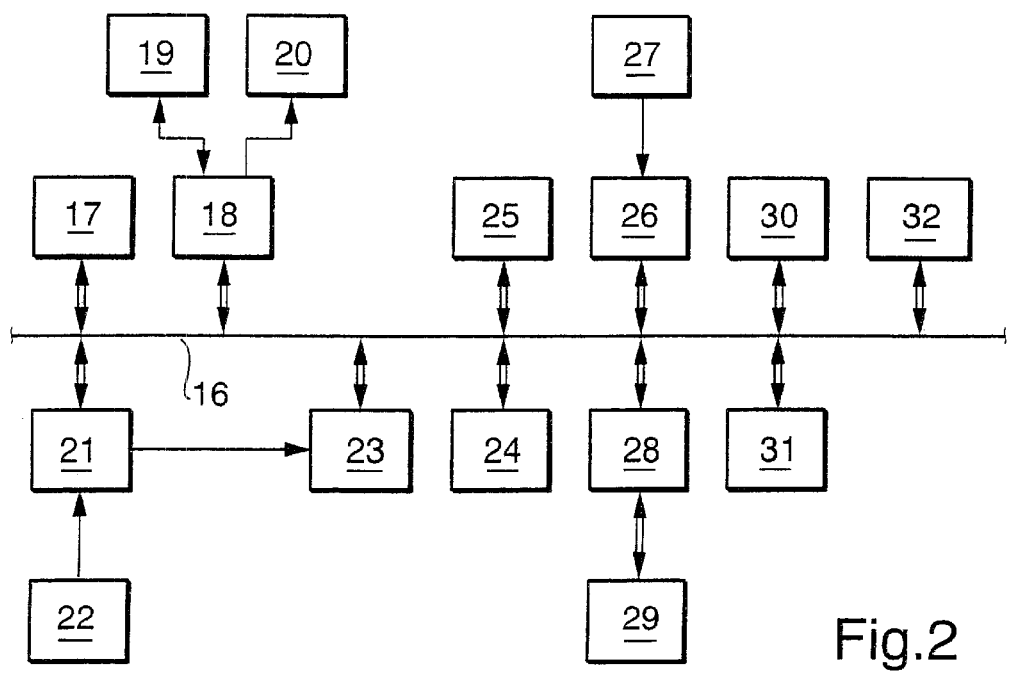
FIG. 2 shows a block diagram of an example embodiment of a device according to the present invention in which the units are connected via a bus.

In a further refinement of the present invention, the components of the example embodiment of the device according to the present invention may be connected via a bus. The block diagram in FIG. 2 shows the device according to the present invention, the components being connected via a bus 16. The components connected directly to bus 16 have a module which controls the transfer of the data via the bus. To bus 16 are connected directly a computing device 17, a signal processing unit 18, a signal processing unit 21, a direction of view recognition 23, a transmitter/receiver station 24 as a mobile phone, a receiving station 25 as an automobile radio, a video analysis 26, an application processor 28, vehicle sensors 30, a actuating technology 32 and a navigational system 31.

A combination 19, made up of a loudspeaker and a microphone, are connected to signal processing unit 18 via a data input/output, and a display 3 is connected to it via a data output. A camera 22 is connected to signal processing unit 21. A camera 27 is connected to video analysis 26, and a memory 29 is connected to application processor 28. The functioning procedure of the individual elements, the interplay of the components and the alternatives correspond to what was described in regards to FIG. 1.

What is claimed is:

1. A device for presenting, in a vehicle, data made available from various data sources, comprising:

a directional arrangement for recognizing a direction of view of a driver of the vehicle;

an optical/acoustical arrangement for providing at least one of an optical presentation and an acoustical presentation of the data as a function of the direction of view of the driver, the optical/acoustical arrangement including a projector to project the optical presentation of the data onto a windshield of the vehicle; and a computing device connected to the directional arrangement and the optical/acoustical arrangement, the computing device configured to receive from the directional arrangement the direction of view of the driver, the computing device further configured to transmit the received direction of view of the driver to the optical/acoustical arrangement, wherein the device is configured to use at least one of the direction of view and voice input of the driver for a selection of a function.

2. The device according to claim 1, wherein the projector projects data onto a retina of the driver.

3. The device according to claim 1, wherein the optical/acoustical arrangement permits at least one of a two-dimensional presentation and a three-dimensional presentation.

4. The device according to claim 1, wherein the optical/acoustical arrangement includes an arrangement for providing the optical presentation of the data and an arrangement for providing the acoustical presentation of the data.

5. The device according to claim 1, further comprising:
a navigational device connected to the computing device in order to supply the data for presentation by the optical/acoustical arrangement.

6. The device according to claim 1, further comprising:
a camera connected to the computing device for supplying a shot of a scene behind the vehicle for presentation by the optical/acoustical arrangement.

7. The device according to claim 1, further comprising:
a memory connected to the computing device, the memory including operating instructions, a user prompting, and a help function for devices present in the vehicle.

8. The device according to claim 1, wherein the directional arrangement includes infrared diodes for illuminating an eye of the driver, and a camera for receiving a light of the infrared diodes reflected at the eye of the driver.

9. The device according to claim 1, further comprising:
a connection that is connectable to a transmitter/receiver station for receiving and retrieving the data, the transmitter/receiver station configured to operate as a data source.

10. The device according to claim 1, further comprising:
a connection that is connectable to a receiving station for receiving the data, the receiving station configured to operate as a data source.

11. The device according to claim 1, further comprising:
a connection that is connectable to vehicle sensors configured to operate as a data source indicating a condition of the vehicle, the optical/acoustical arrangement being configured to present a status message concerning the condition of the vehicle.

12. The device according to claim 1, further comprising:
a connection that is connectable to an actuating technology for controlling a rearview mirror and a height of a headrest of the driver.

13. The device according to claim 1, further comprising:
a bus via which a connection to another component is made.

* * * * *

UNITED STATES PATENT AND TRADEMARK OFFICE
CERTIFICATE OF CORRECTION

PATENT NO. : 6,675,075 B1
DATED : January 6, 2004
INVENTOR(S) : Andreas Engelsberg et al.

It is certified that error appears in the above-identified patent and that said Letters Patent is hereby corrected as shown below:

Title page,
Item [57], ABSTRACT,
Lines 12-14, delete "This may lead to increased safety in street traffic, since distraction of the driver by the various data of the data sources is greatly reduced"

Signed and Sealed this

Twenty-sixth Day of April, 2005

JON W. DUDAS
*Director of the United States Patent and Trademark Office*